Aug. 20, 1957 L. J. WIGGIN ET AL 2,803,711

VARIABLE GAIN AMPLIFIERS

Filed Feb. 4, 1954 2 Sheets-Sheet 1

INVENTOR.
Lyman J. Wiggin
BY Homer H. Elder

Emery, Varney, Whittemore & Dix
ATTORNEYS

Aug. 20, 1957 L. J. WIGGIN ET AL 2,803,711

VARIABLE GAIN AMPLIFIERS

Filed Feb. 4, 1954 2 Sheets-Sheet 2

INVENTOR.

Lyman J. Wiggin

BY Homer H. Elder

Emery, Varney, Whittemore & Dix

ATTORNEYS 2,803,711

VARIABLE GAIN AMPLIFIERS

Lyman J. Wiggin, Freeport, and Homer H. Elder, Little Neck, N. Y., assignors to Reeves Sound Studios, Inc., New York, N. Y., a corporation of New York Application February 4, 1954, Serial No. 408,070

2 Claims. (Cl. 179—171)

This invention relates to audio amplification systems used in radio broadcasting and reproduction, sound recording and the like, and pertains particularly to a component of such systems usually referred to as a variable gain amplifier, but also frequently referred to as a compressor, limiter or expander. The function of such components is to alter the dynamic range of program material so as to reduce it before recording or broadcasting, or to increase it in reproducing or receiving.

Such variable gain amplifiers, compressors, etc. are old and well known in the art, and their nature and uses are well described in the literature of the art. See for example Radiotron Designers Handbook, edited by F. Langford-Smith, 4th edition, published by Wireless Press, 1952, pages 679 to 699, and the references cited thereunder.

It is an object of the present invention to improve such variable gain amplifiers, and in particular to eliminate a considerable portion of the distortion which ordinarily occurs therein.

Other objects and advantages of the invention will appear hereinafter.

A preferred embodiment of the invention selected for purposes of illustration is shown in the accompanying drawings, in which, Figure 1 is a block diagram of a typical variable gain amplifier circuit of the prior art.

Figure 1:
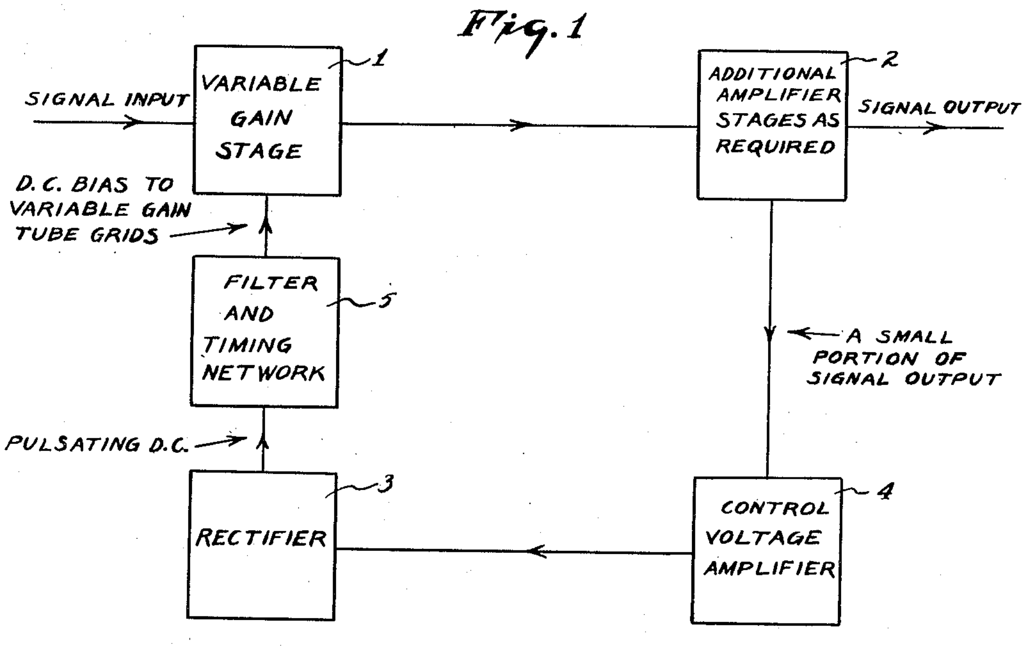

Referring to Figure 1, the block diagram illustrates a familiar type of variable gain amplifier circuit in which the variable gain stage 1 receives an input signal which is amplified and then is usually subjected to one or more additional stages of amplification at 2. A small part of the output signal is fed to a full wave rectifier 3, preferably through a control voltage amplifier 4. The pulsating direct current output of the rectifier is then passed through a filter and timing network 5, and is applied as bias to the grid of a variable gain tube or tubes in the variable gain stage 1.

Such variable gain amplifiers have been widely used, but they have been subject to the objection that they result in a certain amount of distortion, which, although usually tolerable, is, nevertheless, objectionable. Such distortion occurs primarily in the low frequency ranges, and is due to the fact that the efficiency of the filter 5 is limited by usual timing requirements which make it inefficient at low audio frequencies.

Figure 2:
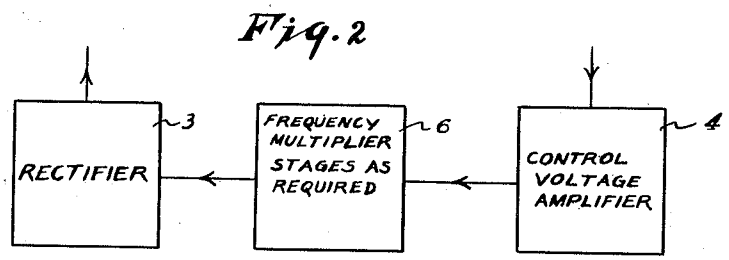
Figure 2 is a block diagram showing the parts added according to the present invention in their operative relationship to the parts of the usual amplifier.

According to the present invention, it is proposed to overcome this difficulty by multiplying the audio frequencies of the input to the rectifier 3 to such extent that they can be handled to better advantage by the filter. For this purpose any suitable means 6 for multiplying a band of audio frequencies may be inserted in the circuit ahead of the rectifier 3, and preferably between the amplifier 4 and the rectifier 3 as shown in Fig. 2.

Figure 3:
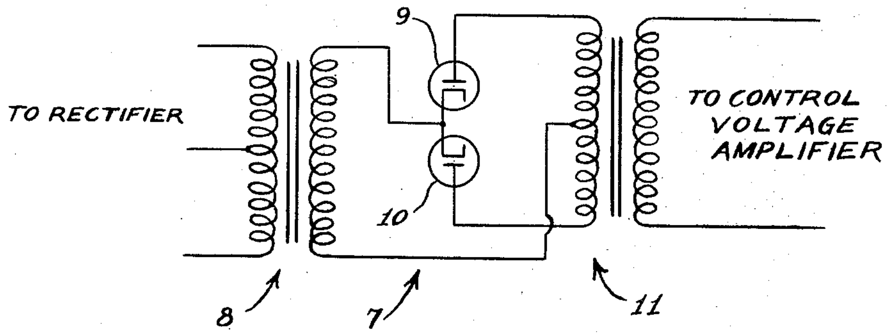
Figure 3 is a circuit diagram of one form of frequency multiplying device.

Thus, in the embodiment illustrated in Fig. 3, such multiplying means comprises an additional rectifier 7 which is coupled to the rectifier 3 through a suitable output coupling network such as transformer 8. As shown in Fig. 3, the rectifier 7 is a full wave rectifier utilizing two diodes 9 and 10. It is coupled to amplifier 4 through transformer 11. In the absence of the present improvement, the primary of transformer 11 would, of course, be coupled directly to the secondary of transformer 8.

Figure 8:
Figures 6, 7 and 8 are wave form diagrams as hereinafter explained.
Figure 7:
Figure 6:
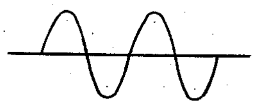

The effect of the rectifier 7 is to convert the alternating current signal to pulsating direct current in which there are four direct current pulses for each two alternating current cycles. This is illustrated diagrammatically in Figs. 6 and 7, in which Fig. 6 illustrates the sine curve wave form of the alternating current input to the rectifier 6, and Fig. 7 illustrates the pulsing form of the rectified direct current, it being noted that there are four direct current pulses for each two alternating current cycles. When the pulsating direct current then passes through the transformer 8, it is converted to alternating current as illustrated diagrammatically in Fig. 8, in which, it will be noted, the frequency is twice that of the original alternating current signal. For many purposes, doubling of the audio frequencies as above described is entirely adequate for it will result in a considerable reduction in distortion of the audio output signal of the amplifier. If desired, however, additional stages of frequency multiplication may be utilized.

Figure 4:
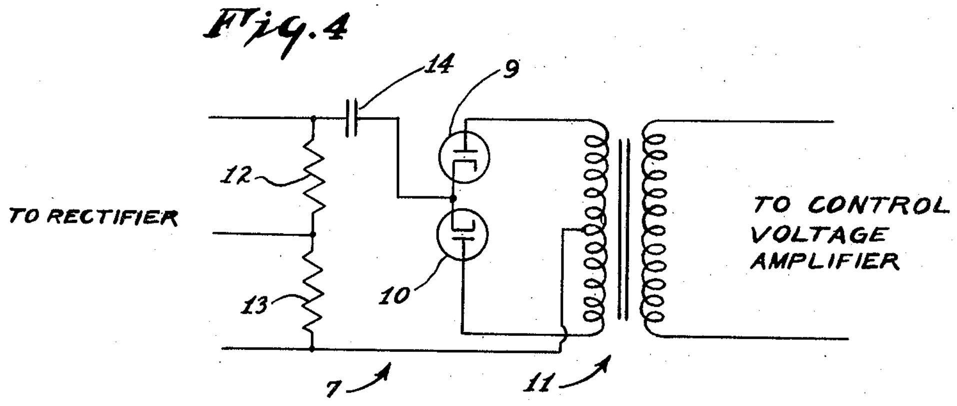
Figure 4 is a circuit diagram of an alternative form of frequency multiplying device.

In the modified form illustrated in Fig. 4, the modification consists merely in the use of a different type of output coupling network. Thus, the rectifier 7 is coupled to the rectifier 3 through a resistance-capacity coupling comprising resistances 12 and 13 and condenser 14. The operation is as previously described, with the resistance-capacity coupling serving to convert the pulsating direct current output of rectifier 7 into alternating current of a frequency double that of the original alternating current signal.

Figure 5:
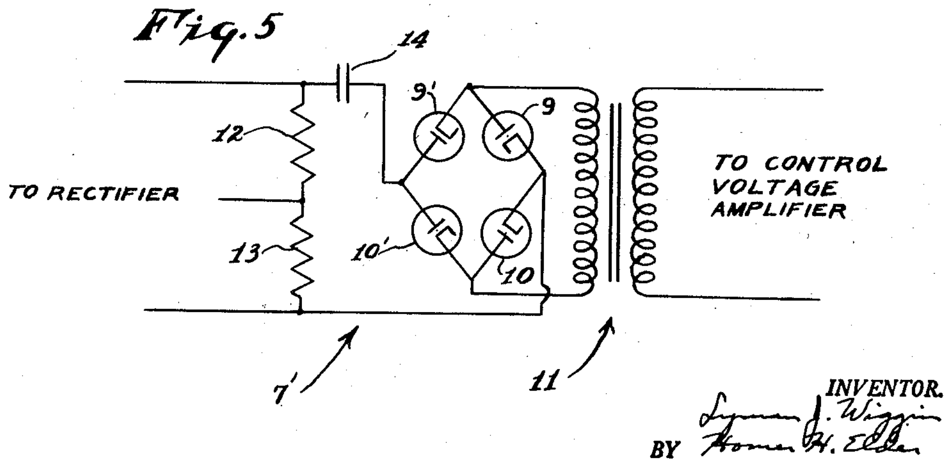
Figure 5 is a circuit diagram of another alternative form of frequency multiplying device.

In the modified form illustrated in Fig. 5, the modification consists in the use of a different type of rectifier, namely, a full wave bridge type rectifier 7'. In Fig. 5, the rectifier 7' is coupled to rectifier 3 through a resistance-capacity coupling as in Fig. 4, although it will be understood that the transformer coupling of Fig. 3 could also be used. It will also be understood that rectifier 3, may, if desired, be a full wave bridge type rectifier.

It will be understood that the invention may be variously modified and embodied within the scope of the subjoined claims.

We claim as our invention:

1. In a low distortion audio frequency amplifier system which includes a grid controlled, variable gain amplifier tube and an audio frequency alternating current signal input therefor, and which produces an audio frequency alternating current output signal, the combination of a rectifier, a filter and timing network inherently inefficient at low audio frequencies, circuit connections for feeding a portion of the audio frequency alternating current output signal through the rectifier and the filter and timing network to the control grid of the variable gain tube, and means in the said circuit connections for multiplying the frequencies of that portion of the audio frequency alternating current output signal of the amplifier which is fed to the said rectifier.

2. A low distortion audio frequency amplifier according to claim 1, in which the frequency multiplying means doubles the frequency.

References Cited in the file of this patent

UNITED STATES PATENTS

| | | |
|---|---|---|
| 736,884 | Shoemaker et al. | Aug. 18, 1903 |
| 2,205,562 | Johannson | June 25, 1940 |
| 2,478,629 | Hiehle | Aug. 9, 1949 |
| 2,611,081 | Spencer | Sept. 16, 1952 |